United States Patent [19]
Kroggel

[11] Patent Number: 5,236,999
[45] Date of Patent: Aug. 17, 1993

[54] OXOACETALS OF POLYVINYL ALCOHOLS, PROCESSES FOR THEIR PREPARATION AND THEIR USE

[75] Inventor: Matthias Kroggel, Kelkheim, Fed. Rep. of Germany

[73] Assignee: Hoechst Aktiengesellschaft, Fed. Rep. of Germany

[21] Appl. No.: 855,898

[22] Filed: Mar. 23, 1992

[30] Foreign Application Priority Data

Mar. 25, 1991 [DE] Fed. Rep. of Germany ....... 4109739

[51] Int. Cl.$^5$ .............................................. C08F 8/28
[52] U.S. Cl. ..................................................... 525/60
[58] Field of Search .......................................... 525/60

[56] References Cited

U.S. PATENT DOCUMENTS 4,357,402 11/1982 Sheibley et al. ...................... 525/61

FOREIGN PATENT DOCUMENTS

| | | |
|---|---|---|
| 0376196 | 7/1956 | European Pat. Off. |
| 0211818 | 2/1987 | European Pat. Off. |
| 2337828 | 2/1975 | Fed. Rep. of Germany |
| 3714276 | 11/1988 | Fed. Rep. of Germany |

Primary Examiner—Joseph L. Schofer
Assistant Examiner—Jeffrey T. Smith
Attorney, Agent, or Firm—Bierman and Muserlian

[57] ABSTRACT

Acetals of polyvinyl alcohol (PVAL) which contain vinyl oxoacetal units of the formula I which are derived from aldehydes containing keto groups (oxoalkanals) and can be crosslinked with hydrazine or polyfunctional hydrazine derivatives or polyfunctional carboxylic acid hydrazides via their keto groups to give high molecular weight products having a variable spectrum of properties are described. Mixed acetals with aldehydes which contain no keto groups can also be prepared and can be crosslinked via the keto groups of the vinyl oxoacetal units. Products which are obtained from PVALs and oxoalkanals or low molecular weight acetals of the oxoalkanals and contain vinyl oxoacetal units are preferably prepared in aqueous or organic media under acid catalysis. For the use of polyvinyl oxoacetals according to the invention, preferably as polymeric binders and coating agents, these can preferably be employed in dissolved or dispersed form, with addition of the abovementioned crosslinking agents, for a number of fields of use, it being possible for the crosslinking to be carried out during or after drying of these solutions or dispersions to form sparingly soluble and swellable or insoluble and non-swellable polymeric modifications having surprisingly advantageous properties.

9 Claims, No Drawings

OXOACETALS OF POLYVINYL ALCOHOLS, PROCESSES FOR THEIR PREPARATION AND THEIR USE

The invention relates to acetals of polyvinyl alcohol which contain oxoacetal units and are obtainable from polyvinyl alcohols by acetalization with aldehydes containing keto groups (oxoalkanals) or with low molecular weight acetals of oxoalkanals by transacetalization. The oxoacetals of polyvinyl alcohols are preferably prepared from the starting components in aqueous or organic media under acid catalysis. The polyvinyl oxoacetals can be crosslinked with hydrazine or polyfunctional hydrazine derivatives or polyfunctional carboxylic acid hydrazides via their keto groups to give products having a variable spectrum of properties.

As is known, polymers which contain vinyl alcohol units in their macromolecules, such as, for example, polyvinyl alcohols, copolymeric polyvinyl alcohols and polyvinyl acetals, can be crosslinked by reaction of their vinylalcoholic hydroxyl groups with compounds which are polyreactive towards OH groups, for example polyfunctional isocyanates, epoxides, carboxylic acid anhydrides, carboxylic acid halides or alkyl halides. The disadvantage of these crosslinking agents is they can be used to only a limited extent, if at all, in aqueous media, which can lead to considerable problems especially with watersoluble polyvinyl alcohols and polyvinyl acetals. The crosslinking reactions must moreover be carried out in some cases at increased temperatures or, in the case of halogen-containing crosslinking agents, with basic compounds to trap and neutralize the hydrogen halides formed during the crosslinking reaction.

The present invention was thus based on the object of providing modified polyvinyl alcohols and polyvinyl acetals which can be crosslinked and used in an industrially advantageous manner without the abovementioned disadvantages and can meet the requirements of a wider field of use.

According to the present invention, this aim can be achieved with acetals of polyvinyl alcohol (PVAL), the macromolecules of which contain vinyl alcohol oxoacetal units and are obtainable from polyvinyl alcohols by acetalization with aldehydes which contain keto groups, i.e. with oxoalkanals, or with low molecular weight acetals of oxoalkanals by transacetalization. Polyvinyl oxoacetals according to the invention can be crosslinked with hydrazine or polyfunctional hydrazine derivatives or polyfunctional carboxylic acid hydrazides via their keto groups, it being possible for the crosslinking to be carried out completely or partially or in stages, and to be matched to the particular requirements. Depending on the solubility of the polyvinyl acetals containing the oxoacetal units, these crosslinking reactions can be carried out in an aqueous or in an organic medium or if appropriate in bulk at normal temperature, and only water is formed as a low molecular weight by-product during the crosslinking.

The invention thus relates to acetals of polyvinyl alcohol (PVAL), the macromolecules of which contain units of the formula I

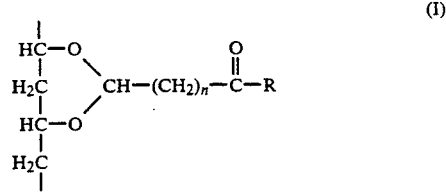

in which $R = (C_1-C_2)$-alkyl, preferably $(C_1-C_4)$-alkyl, in particular methyl, $(C_6-C_{20})$-aryl, -aralkyl or -alkaryl, preferably phenyl, or $(C_5-C_{20})$-cycloalkyl, preferably cyclohexyl, and $n = $ a number from 1 to 10, preferably 1.

According to the invention, the content of keto groups ($>C=O$) in the polyvinyl acetals containing the vinyl alcohol oxoacetal units of the formula I is preferably at least 0.05% by weight, in particular 0.1 to 16% by weight, particularly preferably 0.25 to 12% by weight, based on the weight of the polyvinyl acetal.

In the polyvinyl acetals according to the invention, which contain keto groups, preferably not more than 86 mol-%, in particular up to 80 mol-%, of vinyl alcohol units, based on the total content of vinyl alcohol units in the starting PVAL, are acetalized.

The molecular weight of the starting PVAL is preferably in the range from 2000 to 300,000 g/mol, in particular 10,000 to 225,000 g/mol, determined by the customary methods known from the literature.

The starting PVAL furthermore preferably contains more than 50 mol-%, in particular more than 75 mol-%, of vinyl alcohol units, based on the total number of moles of all the monomer units in the starting PVAL.

In addition to the vinyl acetal monomer units of the formula I, the polyvinyl acetals according to the invention, which contain keto groups, can also contain other vinyl acetal units, preferably aliphatic, aromatic, araliphatic or cycloaliphatic vinyl acetal units which are free from keto groups. Preferred vinyl acetal units which are free from keto groups are derived, in particular, from the group comprising aliphatic $(C_1-C_{20})$-aldehydes, preferably formaldehyde, acetaldehyde, propionaldehyde, butyraldehyde and isononanaldehyde, aliphatic $(C_2-C_{20})$-hydroxyaldehydes, aliphatic $(C_2-C_{20})$-alkoxyaldehydes and cycloalkoxyaldehydes, cyclohexylaldehyde and benzaldehyde, particularly preferably aliphatic $(C_1-C_6)$-aldehydes and benzaldehyde.

The starting PVAL preferably used for the preparation of polyvinyl acetals according to the invention, which contain keto groups, is obtained, in particular, by partial or complete alcoholysis or hydrolysis of polyvinyl esters or polyvinyl ester copolymers which contain carboxylic acid vinyl ester units having 3 to 20 carbon atoms, preferably of polyvinyl acetate or of ethylene/vinyl acetate copolymers.

The invention furthermore relates to a process for the preparation of acetals of polyvinyl alcohols containing oxoacetal units of the formula I by customary methods of polyvinyl acetal preparation under acid catalysis, which comprises reacting polyvinyl alcohols in an aqueous medium or in an aqueous-organic medium or in an organic medium, with addition of an acid catalyst, with the stoichiometrically required amount of a ketoaldehyde of the formula II

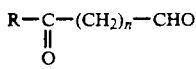

in which R and n have the meaning as in formula I, or of a ketoaldehyde acetal of the formula III

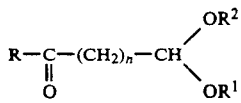

in which R and n have the meaning as in formula I and $R^1$ and $R^2$, which can be identical or different and are preferably identical, are $(C_1-C_{12})$-alkyl, preferably $(C_1-C_5)$-alkyl, $(C_5-C_{12})$-cycloalkyl or $(C_6-C_{12})$-aryl or -alkaryl, particularly preferably methyl, ethyl, i-propyl or butyl, and if appropriate with other aldehydes or aldehyde acetals under acetalization conditions.

If low molecular weight acetals of the formula III are employed, the aldehydes on which they are based and which correspond to the formula II must first be liberated from their acetals by treatment with acids, preferably at elevated temperature, which can preferably be carried out in situ directly and easily in the reaction mixture with the polyvinyl alcohol and the acid catalyst under the acetalization conditions to be maintained for the acetalization of the PVAL.

In the preferred procedure for the polyvinyl acetal synthesis in solution, water is preferably used as the solvent. Mixtures of water with water-miscible solvents, preferably with lower alcohols, tetrahydrofuran or dioxane, can also be used in some cases. However, it is also possible to carry out the acetalization as a heterogeneous reaction, the polyvinyl alcohol, preferably in finely divided form, being made into a slurry with or suspended or dispersed in an organic solvent or a solvent mixture. Suitable solvents for this purpose are preferably liquid alkanols of the formula $C_nH_{2n+1}OH$, in particular methanol, ethanol, propanol or butanol, and furthermore tetrahydrofuran, methylene chloride, chloroform, dioxane, toluene, xylene, benzene, paraffin oil and others.

During the acetalization of PVALs in aqueous solution, the oxoaldehydes or oxoalkanals of the formula II or their low molecular weight acetals of the formula III are reacted with PVALs under the catalytic influence of acids to give corresponding polyvinyl acetals. It is possible here either to meter the acid into the PVAL-aldehyde or PVAL-low molecular weight acetal mixture, or to meter the aldehyde or its low molecular weight acetal into the PVAL-acid mixture. One-pot reactions can also be carried out, but may lead to formation of lumps in the end product, especially in the case of products having a high degree of acetalization.

Acid catalysts which can be employed are in principle all the acids which can be used for the preparation of known polyvinyl acetals. Preferred acids are mineral acids, in particular hydrochloric acid, sulfuric acid, nitric acid, phosphoric acid and amidosulfonic acid. The oxoaldehydes of the formula II or the low molecular weight acetals of the formula III can moreover also be employed for the acetalization as a mixture with other aldehydes or low molecular weight acetals thereof. Aldehydes which contain no keto groups and which can be employed are preferably linear and/or branched aliphatic and/or cycloaliphatic and/or aromatic aldehydes having 1 to 20 carbon atoms, in particular aliphatic aldehydes of the formula $C_nH_{2n}O$, where $n=1$ to 20, aldehydes from the group comprising formaldehyde, acetaldehyde, propionaldehyde, valeraldehyde and isononanaldehyde, and if appropriate derivatives of these aldehydes, being preferred. Butyraldehyde is particularly preferred. Benzaldehyde and derivatives of benzaldehyde are also preferred. It may also be advantageous to use hydroxyaldehydes in some cases. Aldehyde mixtures or mixtures of aldehydes and low molecular weight aldehyde acetals can also be used. The co-use of emulsifiers may also be advantageous in some cases for carrying out the acetalization reaction. Possible suitable emulsifiers are preferably $(C_8-C_{20})$-alkanesulfonic acids, fluorinated long-chain fatty acids, fluorinated long-chain sulfonic acids and long-chain alkylsulfosuccinates, it also being possible for the surfactant strong acids mentioned to catalyze the acetalization reaction at the same time as acid catalysts.

Suitable starting polyvinyl alcohols (starting PVALs) for the acetalization are in principle all the polymers and copolymers which contain vinyl alcohol units in their macromolecules. The following substances can preferably be used such: partly and completely hydrolyzed polyvinyl esters and partly and completely hydrolyzed vinyl ester-comonomer copolymers, the comonomer units preferably being chosen from the group comprising (meth)acrylic acid, (meth)acrylic esters, N-vinylpyrrolidone, ethylene, α-olefins having 3 to 20 carbon atoms, (meth)acrylamide and (meth)acrylamide derivatives, crotonic acid, maleic acid, mesaconic acid, itaconic acid and esters of these acids, styrene and styrene derivatives and acrylonitrile.

The acetalization of partly and completely hydrolyzed polyvinyl esters, these substances, in particular the partly hydrolyzed polyvinyl esters, optionally also containing various amounts of residual non-hydrolyzed carboxylic acid vinyl ester units having 3 to 20 carbon atoms, and especially of partly and completely hydrolyzed polyvinyl acetates, polyvinyl propionates or copolyvinyl esters of vinyl acetate and vinyl propionate, is particularly preferred. The highest possible content of acetalizable vinyl alcohol units in the PVALs is advantageous here in all cases. PVALs with a vinyl alcohol unit content of more than 50 mol %, in particular more than 75 mol %, based on the total number of moles of all the monomer units in the polymer molecules, are therefore preferred.

According to the invention, all polymers of this type and, as described above, containing vinyl alcohol units are described quite generally as polyvinyl alcohols (PVALs) or starting PVALs in the present description.

The weight-average molecular weights of the starting PVALs which can be employed for the acetalization are in principle not subject to any upper limit. Preferably, however, PVALs having molecular weights in the range from 2000 to 300,000 g/mol, in particular 10,000 to 225,000 g/mol, are employed.

To prepare the polyvinyl acetals in aqueous solutions, the PVALs to be acetalized are dissolved in water, preferably in hot water, at temperatures of preferably 80° to 100° C., the solutions are adjusted to PVAL concentrations of preferably 1 to 40% by weight, in particular 5 to 25% by weight, based on the aqueous PVAL solution, and brought to the intended acetalization temperature and the acetalization is carried out according to the invention, using customary acetalization methods. For this reaction, the aldehyde or the aldehyde mixture or the low molecular weight acetal or the acetal mixture or a low molecular weight acetal-aldehyde mixture can be metered into an acid-containing PVAL solution which has been initially introduced into the reaction vessel, or the acid catalyst can be metered into an initially introduced mixture of PVAL solution and aldehyde or of PVAL solution and low molecular weight acetal, while stirring and if appropriate under an inert gas atmosphere. The metering can preferably be carried out in the course of 5 minutes to 10 hours, vigorous stirring being advantageous.

The acetalization reaction can also be carried out as a batch reaction. The amount of aldehydes or their low molecular weight acetals to be added depends on the intended degree of acetalization of the PVAL. As is known, the stoichiometric requirement is $1\kappa$ mol of aldehyde or low molecular weight aldehyde acetal per mol of vinyl alcohol unit to be acetalized. The aldehyde or the low molecular weight aldehyde acetal is preferably employed here in a stoichiometric excess of up to 10 mol %, in particular up to 2 mol %, based on the number of moles of the amount of aldehyde or low molecular weight aldehyde acetal to be used, because the conversion is in general not complete.

For carrying out the acetalization in water or in water-alcohol mixtures, the reaction is preferably started at temperatures between 0° and 10° C. if aldehydes are used, while reaction temperatures in the range from 25° to 50° C. are preferred if low molecular weight aldehyde acetals are used, in order to ensure rapid cleavage of the low molecular weight aldehyde acetal into aldehyde and alcohol. An after-reaction at higher temperatures, preferably in the range between 20° and 70° C., is advantageous in all cases to bring the acetalization reaction to completion. If aldehydes are used, the acetalization reaction can in principle also be carried out without a prior cooling phase.

The amount of acid catalyst to be used is determined in particular by the intended degree of acetalization and is preferably up to 1.1 mol equivalent, based on the molar vinyl alcohol unit content of the PVAL. At high degrees of acetalization, the acetals of the PVAL precipitate preferably in a finely divided form in the aqueous phase during the reaction and can be filtered off with suction, washed with weakly alkaline water, if appropriate washed neutral and dried. Acetalization products of the PVAL which do not precipitate in the aqueous phase during the acetalization reaction, which can preferably be the case at low degrees of acetalization, can be precipitated by addition of preferably liquid precipitating agents and isolated. Suitable precipitating agents are preferably water-miscible organic solvents, for example, in particular, tetrahydrofuran, dioxane, acetone, methanol, ethanol, propanol and butanol.

The acetalization of the PVALs can in principle also be carried out in organic solvents under acetalization conditions. It is carried out as a two-phase reaction (heterogeneous reaction) in the case of PVALs which are insoluble in the solvents chosen, and as a one-phase reaction in the case of PVALs which are soluble in the solvents chosen. All the solvents and acid catalysts which are known to be usable for the synthesis of known polyvinyl acetals can in principle be employed for the acetalization in organic solvents. Preferred solvents are, for example, xylenes, toluene, chloroform and methylene chloride, and in particular also water-miscible solvents, preferably liquid alcohols of the formula $C_nH_{2n+1}OH$, particularly preferably ethanol, methanol or propanol. Acid catalysts which are used are preferably sulfonic acids, for example toluenesulfonic acids, trifluoroacetic acid, mineral acids, for example sulfuric acid, and if appropriate various other strong organic or inorganic acids of low volatility.

The acetalization in organic solvents is preferably carried out by forming a slurry with or suspending or dispersing or dissolving the acid catalyst, the aldehyde or the low molecular weight aldehyde acetal and the PVAL in the solvent and then heating the mixture to the reflux temperature and keeping it under reflux until no further water separates out in the water separator of the reflux condenser. It may be advantageous in some cases if the aldehyde component is not initially introduced into the reaction vessel but is metered into the reaction mixture boiling under reflux over a certain period of time.

During acetalization in organic solvents, the starting PVALs which are insoluble in the solvent in general dissolve as the acetalization progresses and the degree of acetalization increases, provided that the acetalization products formed are soluble in the solvent. In the case of acetalization in organic solvents, the oxoaldehydes of the formula II or low molecular weight acetals thereof of the formula III can also be employed for the acetalization as a mixture with aldehydes which contain no keto groups or low molecular weight acetals thereof. Linear or branched aliphatic or cycloaliphatic or aromatic aldehydes having 1 to 20 carbon atoms are preferably used as the aldehydes which contain no keto groups. Aliphatic aldehydes of the formula $C_nH_{2n}O$, where $n=1$ to 20, in particular, for example, formaldehyde, acetaldehyde, propionaldehyde and isononanaldehyde, and if appropriate derivatives of these aldehydes, are particularly preferred. Butyraldehyde is particularly preferred. Benzaldehyde, derivatives of benzaldehyde and aliphatic $(C_2-C_{20})$-hydroxyaldehydes are likewise preferred.

The aldehydes to be used or their low molecular weight acetals can be metered into the reaction mixture either as a mixture or individually at the same time or individually in succession. If the polymeric acetalization product dissolves in the organic solvent in the course of the acetalization reaction, when the reaction has ended it can be precipitated by suitable liquid organic precipitating agents, such as, for example, acetone, pentane, hexane or heptane, or by pouring the reaction mixture into ice-cold water or ice-cold water/alcohol or water/acetone mixtures, filtered off with suction, washed with weakly alkaline water (pH 9-12) and if appropriate washed neutral and dried. It is in principle also possible to isolate the acetalization products dissolved in organic solvents by distilling off the solvent.

In the PVALs employed for the acetalization, in principle preferably up to 86 mol % of the vinyl alcohol units present in the PVAL can be acetalized, the acetalization of up to 80 mol % of the vinyl alcohol units present, in each case based on the total amount of acetalizable vinyl alcohol units present in the starting PVAL, being particularly preferred here. The percentage proportion by weight of keto groups ($>C=O$) in the PVAL oxoacetals according to the invention is preferably at least 0.05% by weight, in particular 0.1 to 16% by weight and particularly preferably 0.25 to 12% by weight of $>C=O$, based on the weight of polyvinyl acetal according to the invention. The keto group content in the polymeric acetals containing keto groups can be determined by known methods, for example by oxime titration.

If the acetalization of PVALs is carried out as mixed acetalization using aldehydes containing keto groups and aldehydes containing no keto groups, or low molecular weight acetals thereof, the molar ratio of the aldehydes containing keto groups employed to those containing no keto groups, or low molecular weight acetals thereof, should preferably be 1:240 to 240:1, in particular 1:180 to 180:1.

The PVAL acetals which are obtainable according to the invention and contain oxoacetal units can be crosslinked via their keto groups. Suitable crosslinking agents are compounds which have groupings which are reactive toward carbonyl groups. This type of compound includes, preferably, aliphatic, cycloaliphatic and aromatic polyfunctional carboxylic acid hydrazides having 2 to 20 carbon atoms, in particular bifunctional acid hydrazides of aliphatic dicarboxylic acids of the formula $H_2N-NH-CO-(CH_2)_n-CO-NH-NH_2$, where $n=0$ to 10, such as, for example, preferably the dihydrazides of oxalic acid, malonic acid, adipic acid or glutaric acid, or derivatives of these dicarboxylic acid hydrazides. Other suitable crosslinking agents are preferably polyhydrazides of polybasic aromatic carboxylic acids. Preferred crosslinking agents are furthermore hydrazine and polyfunctional organic hydrazine derivatives which contain at least two carbon atoms. Highly crosslinked or partly to slightly crosslinked products can be obtained from the polyvinyl acetals according to the invention, which contain oxoacetal groups, by the crosslinkings which can be achieved according to the invention. The crosslinkings can be infinitely variable in form, and as a result, inter alia, the solubilities and various technological product properties of the polyvinyl acetals can be varied decisively and advantageously, for example if the products are used as polymeric binder components in pressing compositions, varnishes, paints, fibers, paper, mechanical wood pulp for chip-board, coatings, adhesives, corrosion-protective top coats and the like. Acetals according to the invention can preferably be used here in dissolved or dispersed form together with the crosslinking agents. The polymeric products can be crosslinked via their keto groups during or preferably after drying of these solutions or dispersions and form the desired sparingly soluble and swellable or insoluble and non-swellable polymeric modifications with surprisingly advantageous properties.

Polyvinyl acetals acetalized according to the invention with ketoaldehydes can moreover also be modified by reacting them on their keto groups with monofunctional aliphatic, cycloaliphatic or aromatic carboxylic acid hydrazides having 2 to 20 carbon atoms. Aliphatic carboxylic acid hydrazides of the formula $H_3C-(CH_2)_n-CO-NH-NH_2$, where $n+0$ to 20, in particular, for example, the hydrazide of formic acid, acetic acid, propionic acid, butyric acid or valeric acid, and derivatives of these carboxylic acid hydrazieds, are particularly preferably used for this purpose. The resulting reaction products with new property variants open up new possible uses for the polyvinyl acetals.

Further modification possibilities comprise the reaction of the keto groups of oxoacetalized polyvinyl alcohols according to the invention with basic nitrogen compounds, preferably, for example, with hydroxylamine or hydroxylamine derivatives, and furthermore with hydrazine derivatives of the formula $R-NH-NH_2$, in which R is an alkyl, cycloalkyl or aryl radicals having 1 to 20 carbon atoms. Examples of corresponding reactants are preferably 2,4-dinitrophenylhydrazine, and also semicarbazide or semicarbazide derivatives. Reaction products of such reactants with the polymer-bonded ketoacetal groups in principle open up the possibility of immobilizing enzymes, or else, for example, of binding pharmaceutical active compounds polymerically.

The invention is illustrated in more detail by the following examples.

EXAMPLE 1

A 20% strength by weight aqueous PVAL solution is prepared from 800 g of water and 200 g of polyvinyl alcohol (PVAL) at 90° C. in a reaction vessel with a stirrer under a nitrogen atmosphere. The PVAL, obtained by hydrolysis of polyvinyl acetate, exhibits a viscosity in 4% strength by weight aqueous solution at 20° C. of 10 mPa.s (measured in a Höppler viscometer in accordance with DIN 53015) and has a degree of hydrolysis of 98.4 mol %. The solution is then cooled to 45° C., 5.88 g of 3-oxobutyraldehyde dimethyl acetal (=compound of the formula III) and 0.44 g of Ionol (=phenolic oxidation stabilizer from Shell AG) are added, the pH is brought to 3 by addition of a few ml of 20% strength by weight aqueous hydrochloric acid and the mixture is then stirred at 45° C. for 30 minutes. After this period of time, 300 ml of 20% strength by weight aqueous hydrochloric acid are added dropwise to the reaction mixture at a temperature of 45° C. in the course of 1 hour, while stirring, and the mixture is then stirred at 45° C. for a further 4 hours to bring the reaction to completion. The reaction mixture is subsequently cooled to room temperature, the pH is brought to 10 by addition of dilute aqueous sodium hydroxide solution and the polyvinyl acetal is precipitated by pouring the mixture into methanol, filtered off from the liquid phase with suction, washed with methanol and dried.

The resulting polyvinyl acetal has the following characteristic data: keto group content: 0.6% by weight of $>C=O$, based on the polyvinyl acetal, determined by titration (oxime titration) by methods known from the literature (cf. Houben-Weyl, Methoden der Org. Chemie (Methods of Organic Chemistry), Volume II (1953), page 458); the value to be expected theoretically from the amount of oxoaldehyde employed is 0.6% by weight of $>C=O$.

The viscosity of the 4% strength by weight aqueous solution of the polyvinyl acetal at 20° C., determined in a Höppler viscometer in accordance with DIN 53015, is 7.71 mPa.s.

EXAMPLE 2

Example 1 is repeated, with the modification that instead of 5.88 g of 3-oxobutyraldehyde dimethyl acetal, 11.76 g of this component are employed. The resulting polyvinyl acetal has the following characteristic data: keto group content: 1% by weight of $>C=O$, based on the polyvinyl acetal; the value to be expected theoretically from the amount of oxoaldehyde employed is 1.2% by weight of $>C=O$.

The viscosity of the 4% strength by weight aqueous solution of the polyvinyl acetal at 20° C. is 9.69 mPa.s.

EXAMPLE 3

A 7.5% strength by weight aqueous PVAL solution is prepared analogously to Example 1 from. 925 g of water and 75 g of the PVAL of Example 1 at 90° C. The solution is cooled to 40° C., and 112.5 ml of 20% strength by weight aqueous hydrochloric acid and 0.165 g of Ionol are added. 32.4 g of 3-oxobutyraldehyde dimethyl acetal are then metered into the solution in the course of 4 hours and an after-reaction phase then follows at 40° C., with further stirring. The reaction mixture is subsequently cooled to room temperature, the pH is brought to 10 by addition of dilute aqueous sodium hydroxide solution, the product is precipitated by pouring the mixture into methanol and the polyvinyl acetal which has precipitated is filtered off with suction, washed with methanol and dried.

The resulting polyvinyl acetal has the following characteristic data:

keto group content: 5.9% by weight of $>C=O$, based on the polyvinyl acetal; the value to be expected theoretically from the amount of oxoaldehyde employed is 7.5% by weight of $>C=O$.

The viscosity of the 4% strength by weight solution of the polyvinyl acetal in H$_2$O/ethanol 3:7 (parts by volume) at 20° C. is 21.0 mPa.s.

EXAMPLE 4

Example 3 is repeated, with the modification that instead of 32.46 g of 3-oxobutyraldehyde dimethyl acetal, 48.69 g of this component are employed. The resulting polyvinyl acetal has the following characteristic data: keto group content: 9% by weight of $>C=O$, based on the polyvinyl acetal; the value to be expected theoretically from the amount of oxoaldehyde employed is 10.3% by weight of $>C=O$.

The viscosity of the 4% strength by weight solution of the polyvinyl acetal in H$_2$O/ethanol 1:1 (parts by volume) at 20° C. is 44.8 mPa.s.

EXAMPLE 5

A 10% strength 7 by weight aqueous PVAL solution is prepared from 900 g of water and 100 g of polyvinyl alcohol (PVAL) at 90° C. in a reaction vessel as described in Example 1 under a nitrogen atmosphere. The PVAL, obtained by hydrolysis of polyvinyl acetate, exhibits a viscosity in a 4% strength by weight aqueous solution at 20° C. of 20 mPa.s (measured in a Höppler viscometer in accordance with DIN 53015) and has a degree of hydrolysis of 98.4 mol %. The solution is cooled to 45° C., 5.88 g of 3-oxobutyraldehyde dimethyl acetal and 0.22 g of Ionol are added, the pH is brought to 3 by addition of a few ml of 20% strength by weight aqueous hydrochloric acid and the mixture is then stirred at 45° C. for 30 minutes. After this period of time, 150 ml of 20% strength by weight aqueous hydrochloric acid are metered into the reaction mixture in the course of 30 minutes, while stirring, the mixture is cooled to 5° C., 54.54 g of butyraldehyde are metered in over a period of 70 minutes and the reaction mixture is then further stirred at 5° C. for one hour and warmed to room temperature. The polyvinyl acetal which has precipitated is filtered off with suction, washed thoroughly with methanol, then with 10% strength by weight methanolic sodium hydroxide solution and subsequently with methanol again and dried.

The resulting polyvinyl acetal has the following characteristic data, determined by $^1$H- and $^{13}$C-NMR spectroscopy (solvent used: d$^6$-DMSO): keto group content: 0.77% by weight of $>C=O$, content of vinyl alcohol units: 21.2% by weight, content of vinylbutyral units: 71.9% by weight, content of vinyl acetate units: 2.7% by weight, content of vinyl-3-oxobutyral units: 4.3% by weight, in each case based on the polyvinyl acetal.

EXAMPLE 6

Example 5 is repeated, with the modification that instead of 5.88 g of 3-oxobutyraldehyde dimethyl acetal and 54.54 g of butyraldehyde, 11.76 g of 3-oxobutyraldehyde dimethyl acetal and 51.34 g of butyraldehyde are employed.

The resulting polyvinyl acetal has the following characteristic data, determined by $^1$H- and $^{13}$C-NMR spectroscopy (solvent used: d$^6$-DMSO):keto group content: 1.3% by weight of $>C=O$, content of vinyl alcohol units: 21.9% by weight, content of vinylbutyral units: 68% by weight, content of vinyl acetate units: 2.7% by weight, content of vinyl-3-oxobutyral units: 7.4% by weight, in each case based on the polyvinyl acetal.

EXAMPLE 7

250 g of finely divided polyvinyl alcohol (PVAL) are suspended or dissolved in 500 ml of methanol together with 48.8 g of 3-oxobutyraldehyde dimethyl acetal and 4.88 g of p-toluenesulfonic acid in a reaction vessel with a stirrer and reflux condenser under a nitrogen atmosphere, and the mixture is heated at the reflux temperature for 6 hours, with continuous stirring. The PVAL employed, obtained by hydrolysis of polyvinyl acetate, exhibits a viscosity in 4% strength by weight aqueous solution at 20° C. of mPa.s (measured in a Höppler viscometer in accordance with DIN 53015) and has a degree of hydrolysis of 87.7 mol %. The reaction mixture is then cooled to room temperature. The resulting polyvinyl acetate, which is insoluble in methanol, is filtered off with suction, washed with 10% strength by weight methanolic sodium hydroxide solution and then with methanol and dried. It has the following characteristic data: keto group content: 2.6% by weight $>C=O$, based on the polyvinyl acetal (determined as described in Example 1); the value to be expected theoretically from the amount of oxoaldehyde employed is 3.8% by weight $>C=O$.

I claim:

1. An acetal of polyvinyl alcohol (PVAL), the macromolecule of which contains units of the formula I

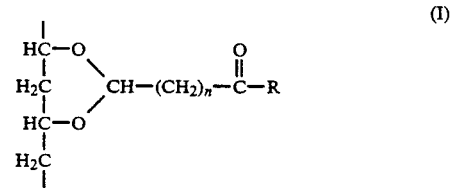

in which R=(C$_1$-C$_{20}$)-alkyl, (C$_6$-C$_{20}$)-aryl, -aralkyl or -alkaryl or (C$_5$-C$_{20}$)-cycloalkyl and n=a number from 1 to 10.

2. An acetal of PVAL as claimed in claim 1, in which its content of keto groups ($>C=O$) is at least 0.05% by weight, based on the weight of the polyvinyl acetal.

3. An acetal of PVAL as claimed in claim 1, in which not more than 86 mol % of the vinyl alcohol units of the PVAL, based on the total content of vinyl alcohol units in the starting PVAL, is acetalized.

4. An acetal of PVAL as claimed in claim 1, in which the molecular weight of the starting PVAL was in the range from 2000 to 300,000 g/mol.

5. An acetal of PVAL as claimed in claim 1, in which the content of vinyl alcohol units in the starting PVAL was more than 50 mol %, based on the total number of moles of all the monomer units in the starting PVAL.

6. An acetal of PVAL as claimed in claim 1, which contains, in addition to vinyl acetal units of the formula I, other vinyl acetal units.

7. An acetal of PVAL as claimed in claim 6, which contains vinyl acetal units which contain no keto groups and are derived from the group comprising aliphatic ($C_1$–$C_{20}$)-aldehydes, aliphatic ($C_2$–$C_{20}$)-hydroxyaldehydes, aliphatic ($C_2$–$C_{20}$)-alkoxyaldehydes and cycloalkoxyaldehydes, cyclohexylaldehyde and benzaldehyde.

8. An acetal of PVAL as claimed in claim 1, in which the starting PVAL was obtained by partial or complete alcoholysis or hydrolysis of a polyvinyl ester or polyvinyl ester copolymer which contains carboxylic acid vinyl ester units having 3 to 20 carbon atoms.

9. An acetal of PVAL as claimed in claim 1, which contains carboxylic acid vinyl ester units having 3 to 20 carbon atoms.

* * * * *